US008851113B2

(12) United States Patent
Taskar et al.

(10) Patent No.: US 8,851,113 B2
(45) Date of Patent: Oct. 7, 2014

(54) SHARED GAS PANELS IN PLASMA PROCESSING SYSTEMS

(75) Inventors: Mark Taskar, San Mateo, CA (US); Iqbal Shareef, Fremont, CA (US)

(73) Assignee: Lam Research Coporation, Fremont, CA (US)

( * ) Notice: Subject to any disclaimer, the term of this patent is extended or adjusted under 35 U.S.C. 154(b) by 305 days.

(21) Appl. No.: 13/431,946

(22) Filed: Mar. 27, 2012

(65) Prior Publication Data

US 2013/0255781 A1 Oct. 3, 2013

(51) Int. Cl.
*F16K 11/20* (2006.01)

(52) U.S. Cl.
USPC ........... 137/597; 137/1; 137/599.03; 137/884

(58) Field of Classification Search
USPC ............. 137/1, 884, 259, 266, 375, 594, 597, 137/271, 599.03
See application file for complete search history.

(56) References Cited

U.S. PATENT DOCUMENTS

| | | | | |
|---|---|---|---|---|
| 2,225,153 | A * | 12/1940 | Brown | 137/384 |
| 5,605,179 | A * | 2/1997 | Strong et al. | 137/884 |
| 5,992,463 | A * | 11/1999 | Redemann et al. | 137/884 |
| 6,302,141 | B1 * | 10/2001 | Markulec et al. | 137/269 |
| 7,334,605 | B2 * | 2/2008 | Vu | 137/884 |
| 2004/0185584 | A1 | 9/2004 | Lin et al. | |
| 2005/0087072 | A1 | 4/2005 | Wodjenski et al. | |
| 2006/0272720 | A1 | 12/2006 | Milburn | |
| 2006/0272721 | A1 * | 12/2006 | Milburn | 137/884 |
| 2008/0044960 | A1 | 2/2008 | Al-Bayati et al. | |
| 2009/0114295 | A1 | 5/2009 | Milburn et al. | |
| 2009/0142930 | A1 | 6/2009 | Hammond, IV et al. | |
| 2010/0200071 | A1 * | 8/2010 | Morgan | 137/1 |
| 2010/0224322 | A1 | 9/2010 | Sui et al. | |
| 2011/0265549 | A1 | 11/2011 | Cruse et al. | |
| 2011/0265951 | A1 * | 11/2011 | Xu et al. | 156/345.26 |
| 2011/0269314 | A1 | 11/2011 | Lee et al. | |
| 2012/0097266 | A1 | 4/2012 | Cobb et al. | |
| 2013/0255782 | A1 | 10/2013 | Shareef | |

FOREIGN PATENT DOCUMENTS

| | | | |
|---|---|---|---|
| EP | 0675312 A1 | | 4/2012 |
| WO | WO 2013/148473 | | 10/2013 |
| WO | WO 2013/148474 | | 10/2013 |

OTHER PUBLICATIONS

PCT International Search Report for PCT/US2013/33371 dated Mar. 21, 2013, 2 pages.
PCT International Search Report for PCT/US2013/33373 dated Mar. 21, 2013, 2 pages.

* cited by examiner

*Primary Examiner* — Stephen M Hepperle
*Assistant Examiner* — Jessica Cahill

(57) ABSTRACT

Methods and apparatus for shared gas panel for supplying a process gas to a plurality of process modules are disclosed. The shared gas panel includes a plurality of mixing valves and at least two mixing manifolds for a given mixing valve to service at least two process modules. The mixing manifolds are disposed on a given plane and staggered to save space. Components of the shared gas panel are also stacked vertically in order to reduce volume of the shared gas panel enclosure. Components are optimized such that the two mixing manifolds coupled to the given mixing valve receive equal mass flow to eliminate matching issues.

19 Claims, 5 Drawing Sheets

SHARED GAS PANELS IN PLASMA PROCESSING SYSTEMS

BACKGROUND OF THE INVENTION

Substrate processing systems have long been employed to process substrates to produce electronic devices (such as integrated circuit dies or flat display panels or solar panels). In a modern substrate processing system, multiple process modules (PMs) may be provisioned per system. This is commonly known as the clustered tool approach, and a cluster tool is commonly understood to include multiple processing modules for processing multiple substrates in parallel.

Generally speaking, each process module is configured to process one or more substrates in accordance with the same or different recipes/processes. Since the processing of substrates typically requires a plurality of process gases (such as etching or deposition or tuning gases), each process module (or chamber, as the term "chamber" is used interchangeably with "process module" herein) is typically provisioned with its own gas panel in the past in order to selectively provide a set of required process gases to the process module to execute a desired recipe.

To elaborate, a gas panel represents the arrangement that performs the function of receiving the plurality of process gases, selectively providing selective gases of the plurality of process gases to the process module in accordance with parameters specified by the recipe. These parameters may include one or more of volume, pressure, and temperature, for example.

Gas panels are, however, fairly bulky and are relatively expensive items to purchase, operate, and maintain. A typical gas panel includes a plurality of input and output gas lines, a plurality of valves for volume/pressure control and for safety/isolation of the individual process gases and associated sensor/control/communication electronics. The typical gas panel also typically includes a mixing manifold for mixing the process gases prior to supplying such process gases to the process module. The large number of components increases the cost to acquire, operate, and maintain the substrate processing system.

Reducing the cost of acquiring, operating, and maintaining substrate processing systems by simplifying and/or reducing the number of gas panels is one among many goals of embodiments of the present invention.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS

Figure 1:
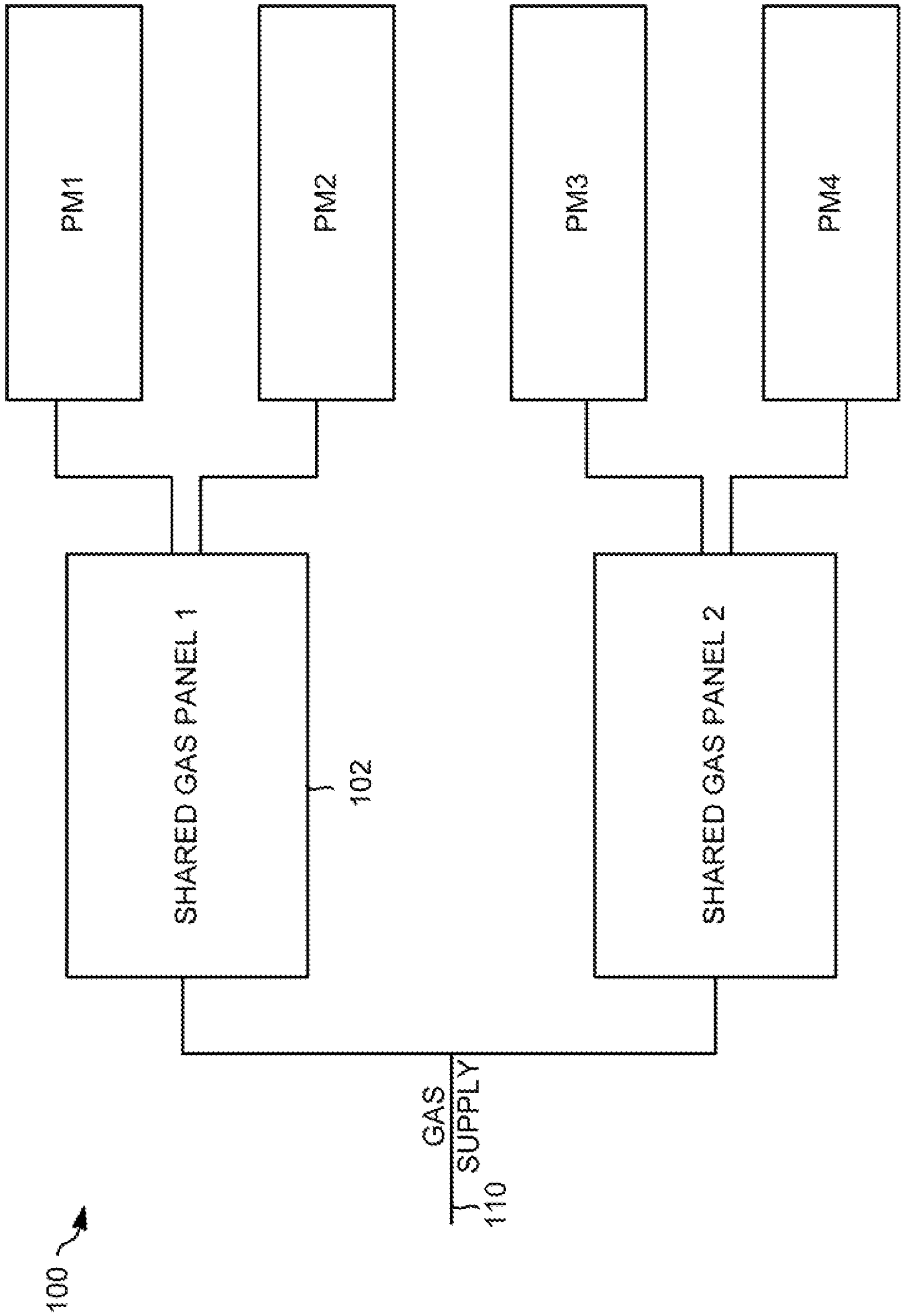
FIG. 1 shows, in accordance with an embodiment of the invention, an arrangement for supplying process gases to a set of process modules of a cluster tool.

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described hereinbelow, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various Embodiments of the invention relate to methods and apparatus for reducing the number and size of gas panels in a substrate processing system. In one or more embodiments, it is realized by the inventors herein that if substrate processing systems are constructed and best practices are established such that if multiple process modules of the same cluster tool carry out the same recipe at the same time to execute the same process on different substrates in these different process modules, it is unnecessary to provide each such process module with an independently controllable gas box. In an embodiment, multiple process modules share a gas panel, thereby reducing the number of components that need to be purchased and maintained. Each shared gas panel (SGP) can service two or more process modules simultaneously.

More importantly, embodiments of the invention involve arrangements and techniques to minimize the volume occupied by components of the shared gas panel (SGP). For example, embodiments of the invention involve staggering the mixing manifolds such that multiple mixing manifolds can occupy the same footprint as one prior art manifold. This is important since modern safety requirements specify that components of a gas panel (such as valves, mass flow controllers, gas line connectors) be isolated from the ambient environment by a containment structure. The air in the containment structure is constantly pumped out and scrubbed (i.e., processed to remove or render relatively harmless any gas that may be leaked from the gas panel components). In an example gas panel currently in use, about 150 CFM (cubic feet per minute) of containment structure air needs to be pumped and scrubbed every minute. This pumping and scrubbing needs to be performed whenever the cluster tool is in operation and contributes in a non-trivial way to the cost of owning and operating the cluster tool when a large number of high volume gas panels are involved.

If fewer gas panels are employed in the cluster tool, less containment structure air needs to be pumped and scrubbed, thereby reducing the cost of tool ownership. Furthermore, if the inventive shared gas panel (SGP) that services multiple process modules can be kept small in volume such that the components of the shared gas panel fit in a smaller containment structure, less containment structure air needs to be pumped and scrubbed, thereby reducing the cost of owning and operating the cluster tool. With fewer gas panels and gas containment structures, the probability of gas leak to the environment may also be reduced.

In an embodiment, there is provided an apparatus for supplying selective process gases to a set of process modules that includes at least two process modules. The apparatus includes a gas evacuation containment structure (i.e., a containment structure that isolates the components within the containment structure from the ambient environment and is configured to have its interior air frequently or constantly evacuated to a treatment system). Within the containment structure, there are provided a plurality of 3-port mixing valves. Each 3-port mixing valve includes an input port, a first output port, and a second output port.

The process gases are selectively supplied to the input ports of the mixing valves using a plurality of upstream primary valve and/or mass flow controllers. If an upstream primary valve and/or mass flow controller shuts off, the process gas associated with the gas line on which the upstream primary valve and/or mass flow controlled is closed does not get delivered to an input port of a mixing valve and is not used in the processing of the substrate.

In an embodiment, in each 3-port mixing valve, the input port is coupled to both the first output port and the second output port such that when the 3-port mixing valve is on, the input port provides gas to both the first output port and the second output port. When the 3-port mixing valve is off, the input port stops providing gas to both the first output port and the second output port.

In another embodiment, in each 3-port mixing valve, the input port is selectively coupled to both the first output port and the second output port such that when the 3-port mixing valve is on, the input port provides gas (depending on a control input, which may be pneumatic, hydraulic, or electrical) to 1) both the first output port and the second output port, or 2) only the first output port, or 3) only the second output port. When the 3-port mixing valve is off, the input port stops providing gas to both the first output port and the second output port. The first output ports of the mixing valves are coupled to the plurality of input ports of a first mixing manifold, while the second output ports of the mixing valves are coupled to the plurality of input ports of a second mixing manifold. The first mixing manifold represents the shared gas manifold within which process gases from various first output ports of various mixing valves are mixed before being delivered via a first mixing manifold output port to the first process module of the cluster tool. The second mixing manifold represents the gas manifold within which process gases from various second output ports of various mixing valves are mixed before being delivered via a second mixing manifold output port to the second process module of the cluster tool. Although only a 3-port mixing valve and 2 mixing manifolds are discussed in the example herein, it should be understood that it is also possible to have a 4-port mixing valve (1 input port and 3 output ports) working with 3 mixing manifolds, or a 5-port mixing valve (1 input port and 4 output ports) working with 4 mixing manifolds, and so on. In an embodiment, the first mixing manifold and the second mixing manifold are oriented in parallel such that their longitudinal axis are parallel to a first direction or such that their manifold input ports generally line up parallel to the first direction. In an embodiment, each of these mixing manifolds assumes the general shape of a tubular length having a longitudinal dimension and a cross section. The cross-section may be circular or may be square or rectangular or any other enclosed shape. The longitudinal dimension forms an axis that is parallel to the aforementioned first dimension in this embodiment.

Each set of three ports that includes the input port, the first output port, and the second output port of each mixing valve are lined up in a line that is parallel to a second direction. More importantly, the second direction is at an angle with the first direction with which the mixing manifolds are oriented. As the term is employed herein, the second direction is deemed to be "at an angle" with the first direction when the second direction is neither orthogonal nor parallel to the first direction. By staggering the mixing manifolds and thus angling each mixing valve such that its input port, first output port, and second output port line up in a direction that is at an angle with the first direction with which the mixing manifolds are oriented, the mixing manifolds may be placed closer together, thereby reducing the volume of the components of the shared gas panel and concomitantly reducing the volume of the containment structure that houses these components. In some cases, multiple mixing manifolds can occupy the same footprint formerly employed to accommodate a prior art manifold.

In an embodiment, the mixing valves occupy a given plane. The first mixing manifold is disposed on a first plane under the mixing valves plane, while the inlet lines that supply the process gas to the mixing valve input ports are placed on a second plane under the mixing valves, with the second plane being disposed between the first plane and the mixing valves. In an embodiment, both the first mixing manifold and the second mixing manifold are disposed on the first plane under the mixing valves while the inlet lines that supply the process gas to the input ports of the mixing valves are placed on a second plane under the mixing valves plane, with the second plane being disposed between the first plane and the mixing valves plane. By stacking various components in different vertical planes, the volume of the components of the shared gas panel may be further reduced.

The features and advantages of embodiments of the invention may be better understood with reference to the figures and discussions that follow.

FIG. 1 shows, in accordance with an embodiment of the invention, an arrangement for supplying process gases to a set of process modules PM1-PM4 of a cluster tool 100. A gas supply 110 is shown providing process gases to Shared Gas Panel 1 and Shared Gas Panel 2. Generally speaking, the gas supply includes multiple gas lines, each of which may provide one specific process gas from the gas supply store (such as a storage tank via appropriate supply tubing). Shared Gas Panel 1 is shown supplying process gas(es) to both process modules PM1 and PM2. In an embodiment, PM 1 and PM 2 both execute the same recipe. In another embodiment, PM1 and PM2 may execute different recipes.

Although only two shared gas panels are shown in the example of FIG. 1, a cluster tool may include any number of shared gas panels and individual (one-per-process-module) gas panels or any mixture thereof. Further, although two process modules per shared gas panel are shown, a shared gas panel may supply process gas(es) to as many process modules as desired. Further, although only four process modules are shown, a cluster tool may have as many process modules as desired. Shared Gas Panel 1 is shown with a gas evacuation containment structure 102, representing the environmental enclosure for isolating the components of the shared gas panel from the ambient environment. In use, the gas within gas evacuation containment structure 102 is evacuated periodically or continually (using pumps, for example) for treatment (such as scrubbing).

Figure 2:
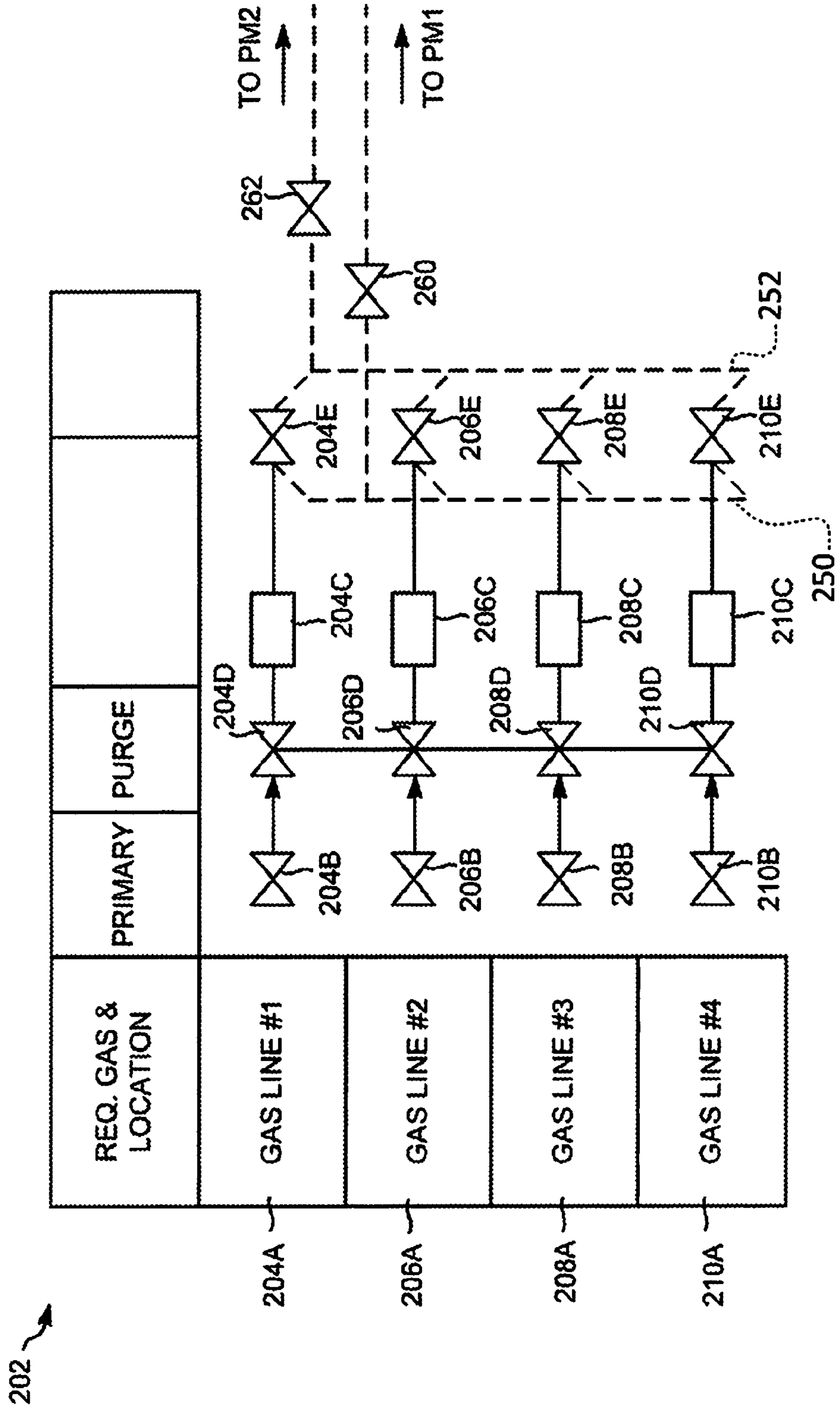
FIG. 2 conceptually shows, in accordance with an embodiment of the invention, some relevant components within a shared gas panel (SGP).

FIG. 2 conceptually shows, in accordance with an embodiment of the invention, some relevant components within a shared gas panel (SGP) 202, such as shared gas panel 1 of FIG. 1. SOP 202 is shown receiving four process gases through four gas input lines 204A, 206A, 208A, and 210A although a typical SGP may receive 17 or more gases (the number of gas input lines may vary as desired). Each of gas input lines 204A, 206A, 208A, and 210A is coupled to a respective primary valve 204B, 206B, 208B, and 210B. Each primary valve may be programmatically controlled to select which process gas may be provided to the mixing manifolds 250 and/or 252 (to be discussed later). A set of purge valves 204D, 206D, 208D, and 210D, which is part of a purging system, are also shown although purge valves and purge systems are conventional and are not part of the present invention.

Mass Flow Controllers (MFC) 204C, 206C, 208C, 210C are in gaseous communication with primary valves 204A, 206A, 208A, and 210A to selectively receive input process gas from the primary valves (depending on which primary valve is open). As is well known, a mass flow controller is employed to regulate (including shutting off) the flow rate and/or pressure of the gas delivered. Downstream of the mass flow controllers are the mixing valves, each of which is in gaseous communication with a respective mass flow controller. In the example of FIG. 2, there are two mixing manifolds 250 and 252 coupled in gaseous communication with each of mixing valves 204E, 206E, 208E, and 210E. Since each mixing valve has one input port for receiving a process gas from its respective manifold (e.g., mixing valve 204E receiving process gas from MFC 204C and mixing valve 208E receiving process gas from MFC 208C and two output ports for coupling to the two mixing manifolds 250 and 252, each mixing valve is thus a 3-port valve (one input port and 2 output ports). Mixing valves 204E-210E may be pneumatically operated, electrically operated, mechanically operated, or hydraulically operated, for example.

Mixing manifold 250 receives its input gas(es) via the mixing valves and mixes the process gas(es) before delivering the process gas(es) to its process module PM 1 via an isolation valve 260. Likewise, mixing manifold 252 receives its input gas(es) via the mixing valves and mixes the process gas(es) before delivering the process gas(es) to its process module PM 2 via an isolation valve 262. Isolation valves isolate the process modules from the gas panels and are employed for volume/flow control purposes during processing and maintenance, for example.

In the example of FIG. 2, the mixing valves are single-input-two-common-outputs valves. In other words, when the valve is open, gas from the input port is provided to both output ports simultaneously. In this case, each mixing valve is essentially a splitter valve and both mixing manifolds 250 and 252 will receive the same type of process gas(es).

In other embodiments, the mixing valve may, as discussed earlier, selectively provide gas from its input port to any one of the output ports, any combination of output ports, or to all output ports. With this capability, it is possible to have different mixtures in mixing manifolds 250 and 252 to execute different recipes in the two process modules associated with SGP 202, for example. As mentioned, more than 2 output ports may be provided per mixing valve if there are more than 2 mixing manifolds and/or more than 2 process modules.

Figure 3:
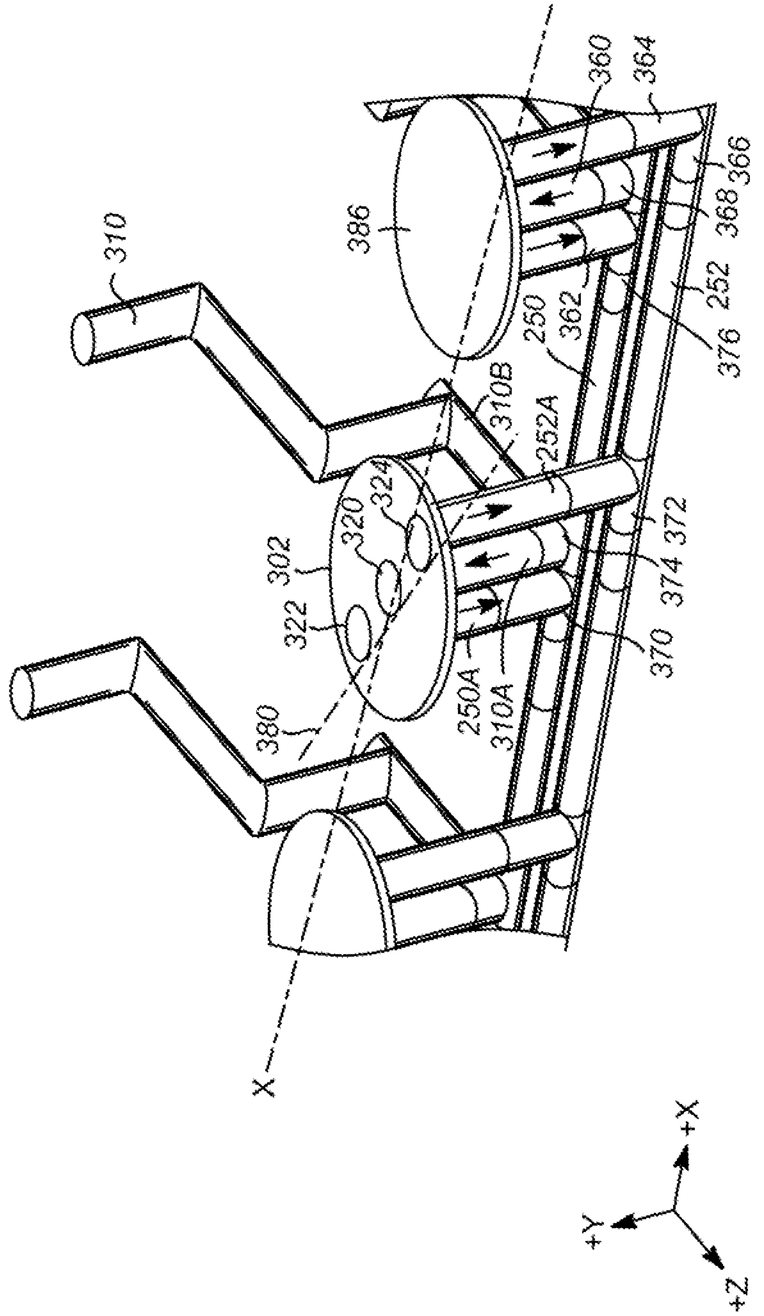
FIG. 3 shows the spatial arrangements of some relevant components of the shared gas panel in accordance with one or more embodiments of the invention.

In accordance with an embodiment, the mixing manifolds are disposed under the mixing valves in order to save space and to reduce the volume within the containment enclosure. This is best seen in FIG. 3 wherein mixing manifolds 250 and 252 are disposed under plane portion 302, representing a portion of a plane at which the mixing valve flange (402 of FIG. 4) may be disposed. In FIG. 3, mixing manifolds 250 and 252 occupy the same plane in the Y dimension under the mixing valve. Further, gas line portion 310 that is coupled to the input port (marked with reference number 310A) occupies, at its bottom end, a different plane in the Y-dimension that is higher than the Y-dimension plane occupied by the mixing manifolds 250 and 252. In other words, the input gas line (whether is vertical portion or the circumference of its horizontal portion) does not extend downward to the plane occupied by mixing manifolds 250 and 252. By displacing the space-occupying gas lines vertically and also from the mixing valves themselves, it is possible to squeeze mixing manifolds 250 and 252 closer together (in the Z dimension in the example of FIG. 3) to save space. Accordingly, less horizontal space (in the X-Z plane of FIG. 3) is required, leading to reduced SGP volume. This is particularly true for industry-standard rectangular box-shaped enclosures since the height of such an enclosure is typically governed by its tallest component. If components are spread-out in the X-Z plane, not only would the footprint be unduly large but a lot of interior volume space would have been wasted as a result.

In the example of FIG. 3, a process gas is provided via gas line 310 and travels upward portion 310A in the +Y direction to the input port of the mixing valve via hole 320 (hole 320 represents an imaginary cut-away aperture in gas line portion 310A for illustration purposes). If the mixing valve is open, the process gas will be distributed to one or both of output ports by traveling down one or both of holes 322 and/or 324 in the −Y direction. Holes 322 and 324 represent imaginary cut-away apertures in gas line portions 250A and 252A (which are in gaseous communication with mixing manifolds 250 and 252 respectively) to be mixed in manifolds 252 and 250 respectively.

As can be seen in the example of FIG. 3, gas is provided to the mixing manifolds 252 and 250 from portions 252A and 250A via T-couplings 372 and 370. Gas is provided to the input port of the mixing valve (by traveling up portion 310A) via an L-coupling 374. A short horizontal portion 310B is employed to provide the input gas in a plane that is higher (more positive in the Y direction) than the plane occupied by the mixing manifolds 250 and 252).

In one or more embodiments, the tubing lengths, number of turns, and/or the tubing construction/diameters of the two gas paths from the two mixing valve outlet ports to its two mixing manifold are kept as similar as possible to ensure that each mixing manifold receive the same mass flow from the MFC with the same pressure, gas velocity, and concentration. In one or more embodiments, these gas paths may be optimized with different tubing lengths, number of turns, and/or tubing diameters/construction to ensure that each mixing manifold receive the same mass flow from the MFC with the same pressure, gas velocity, and concentration.

FIG. 3 also shows another process gas provided via L-coupling 368 and gas line 360 to another mixing valve coupled to plane portion 386 and distributed to the two mixing manifolds 250 and 252 via lines 362 and 364.

FIG. 3 shows mixing manifolds 250 and 252 oriented along direction X such that its input ports line up along the same direction X. Thus, input ports of manifold 252 (i.e., the upward pointing portions of T-couplings 366 and 372) that couple to portions 364 and 252A respectively line up parallel to direction X of FIG. 3 (also direction X of FIG. 5). Similarly, input ports of manifold 250 (i.e., the upward pointing portions of T-couplings 370 and 376) that couple to portions 250A and 362 respectively line up parallel to direction X of FIG. 3. Similarly, input ports of the mixing valves (i.e., the upward pointing portions of L-couplings 374 and 368) that couple to portions 310A and 360 respectively line up parallel to direction X of FIG. 3. Since each mixing manifold has a long dimension (e.g., longitudinal dimension in the case of a tubular structure such as those shown in FIG. 3) and a cross section (e.g., a round or some other polygonal cross section in the case of a tubular structure), the long dimension of the mixing manifold represents the mixing manifold direction herein. In the example of FIG. 3, this mixing manifold direction is also in the direction +/−X.

The three input/output ports (or at least one input port and 1 output port) of each mixing valve line up in a direction that is at an angle with direction X of FIG. 3. In the example of FIG. 3, the input port for the mixing valve that is coupled plane portion 302 occupies the positions denoted by reference number 320. The two output ports for the mixing valve that is coupled to plane portion 302 occupy the positions denoted by reference numbers 322 and 324. As can be seen holes 320, 322, and 324 line up along the direction of line 380, which is at an angle (i.e. other than orthogonal or parallel) to the X direction (i.e., the mixing manifold direction or the mixing manifold longitudinal direction).

Figure 4:
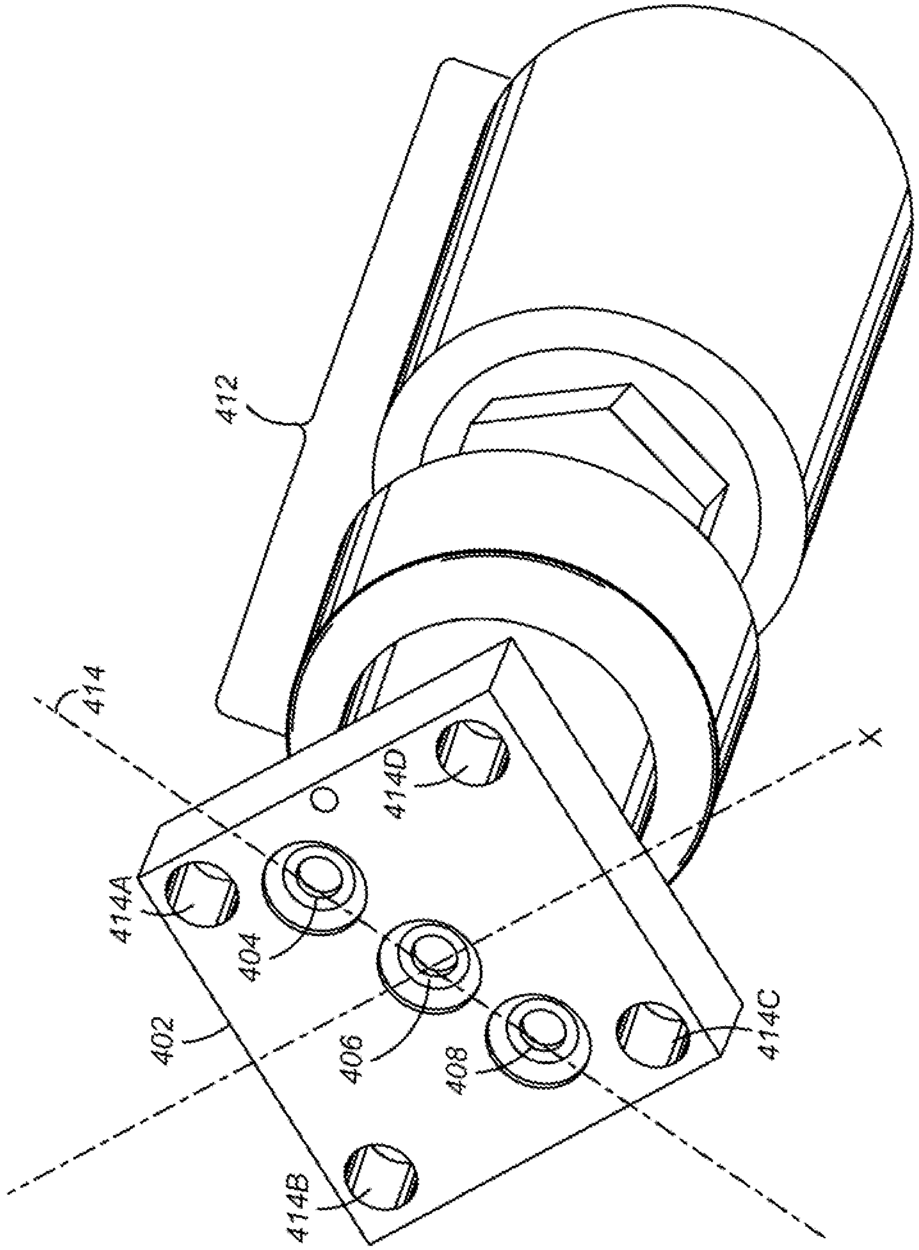
FIG. 4 shows another view of the mixing valve of the type commonly employed in industry.

FIG. 4 shows the three ports 404, 406, and 408 of the mixing valve. Input port 406 is sandwiched between output ports 404 and 408. Together, ports 404, 406, and 408 line up in the direction 414, which is at an angle to the mixing manifold direction X. In other words, the mixing manifolds are oriented in the direction X of FIG. 4, and the ports of a given mixing valve (either all three or the input port to the mixing valve and either of the output ports to the two mixing manifolds) line up along direction 414, which is at an angle (i.e., not orthogonal or parallel) to mixing manifold direction X. This angle may be deemed diagonal or an acute angle (less than 90 degrees) depending on which direction is deemed positive for reference direction X, for example. For completeness, body 412 housing the valve body and controls is also shown in FIG. 4. Also shown are mounting flange 402 and mounting holes 414A, 41413, 414C, and 414D. In practice, flange 402 of FIG. 4 mates with tubes 252A, 310A, and 250A of FIG. 3 at the plane shown by plane portion 302.

Figure 5:
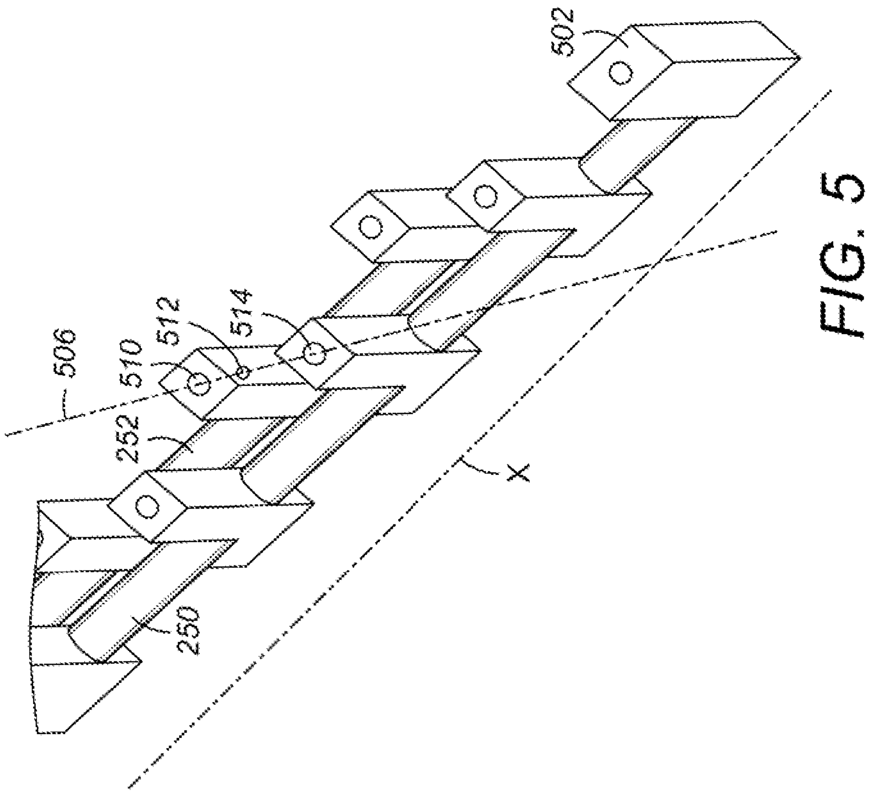
FIG. 5 shows the stagger arrangement of the two weldments forming two mixing manifolds of a shared gas panel.

As can be seen in the example of FIG. 5, the mixing manifolds are parallel and essentially "staggered" such that each set of 3 ports of each mixing valve (1 input port to the mixing valve and 2 output ports to the two mixing manifolds) line up parallel to direction 506. In one or more embodiments, these two mixing manifolds are identical weldment parts to save inventory and manufacturing cost.

Similarly, the input port for the mixing valve that is coupled to mixing manifold input ports 510 and 514 occupy the position denoted by reference number 512. Thus this mixing valve input port and its two mixing valve output ports (coupled to mixing manifold input ports 510 and 514) line up parallel to direction 506. As mentioned, direction 506 is considered to be "at an angle" with the X direction (which is parallel to the longitude of the mixing manifolds) if they are not orthogonal or parallel to one another.

FIG. 5 also shows a mixing assembly output port 502, representing the port for outputting the mixed process gas to the process module coupled to mixing manifold 250. Another mixing assembly output port (not shown to improve clarity in FIG. 5) is also provided for mixing manifold 252. The output port may be provided at one end of the mixing manifold, or may be provided anywhere along its shared length.

By staggering the mixing manifolds such that the ports of a given mixing valve line up along a direction (such as 506) that is at an angle relative to the mixing manifold longitudinal axis direction X and also vertically displacing components (such that portion 310B occupy a different plane compared to the plane occupied by mixing manifolds 250 and 252 in FIG. 3 and the mixing valves occupy a different plane), it is possible to dispose the input line (such as portion 310A of FIG. 3) to a mixing valve in between the two mixing valve output lines (such as portions 250A and 252A of FIG. 3) and still allow the mixing manifolds to be squeezed together tightly in the Z direction in FIG. 3. This is particularly true if industry-standard mixing valves having its input and output ports lined up in a single line are to be used. If the ports are not angled relative to the mixing manifold longitudinal axis direction and disposed at different planes, such volume-saving arrangement would not have been possible with these industry-standard valves.

As can be appreciated from the foregoing, embodiments of the invention permit a single shared gas panel to selectively provide process gas(es) to a plurality of process modules. By ensuring that each mixing manifold receive the same mass flow, matching issues are eliminated. By reducing the number of gas panels per cluster tool, fewer gas panel components (such as valves, MFCs, connectors, transducers, sensors, etc.) need to be acquired and/or maintained. Further, one or more embodiments of the invention stagger the mixing manifolds (e.g., in the X-Z direction of FIG. 3) and/or vertically displace (e.g., in the Y direction of FIG. 3) the lines that feed the ports of the mixing valves as well as the valves themselves (such that at least 3 planes are involved), the components can be squeezed into a smaller footprint and thus smaller volume, thereby reducing the volume occupied by the gas panel components. When such volume is reduced, less air needs to be pumped and purged, leading to reduced operating cost.

While this invention has been described in terms of several preferred embodiments, there are alterations, permutations, and equivalents, which fall within the scope of this invention. Although various examples are provided herein, it is intended that these examples be illustrative and not limiting with respect to the invention. For example, although the apparatus is described in the example, the invention also covers methods for providing, making and/or assembling the apparatus by coupling the components together to form the structure described or for operating the plasma processing system by operating the apparatus to employ its intended functionality and advantages. Also, the title and summary are provided herein for convenience and should not be used to construe the scope of the claims herein. Further, the abstract is written in a highly abbreviated form and is provided herein for convenience and thus should not be employed to construe or limit the overall invention, which is expressed in the claims. If the term "set" is employed herein, such term is intended to have its commonly understood mathematical meaning to cover zero, one, or more than one member. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A gas panel for supplying selective ones of a plurality of process gases to a set of process modules having at least two process modules, comprising:

a plurality of mass flow controllers, each of said plurality of mass flow controllers having an MFC input port and an MFC output port, wherein MFC input ports of said plurality of mass flow controllers are coupled to receive said first plurality of process gases;

a plurality of mixing valves, each of said plurality of mixing valves having an input port and a first output port and a second output port, wherein input ports of said plurality of mixing valves are in gaseous communication with MFC output ports of said plurality of mass flow controllers;

a first mixing manifold having a plurality of first mixing manifold input ports and at least one first mixing manifold output port for outputting gas from said first mixing manifold to a first process module of said at least two process modules, wherein first output ports of said plurality of mixing valves are in gaseous communication with said first mixing manifold input ports; and a second mixing manifold having a plurality of second mixing manifold input ports and at least one second mixing manifold output port for outputting gas from said second mixing manifold to a second process module of said at least two process modules, wherein second output ports of said plurality of mixing valves are in gaseous communication with said second mixing manifold input ports, wherein said first mixing manifold and said second manifold are disposed under said plurality of mixing valves thereby reducing a volume of said gas panel, wherein said first mixing manifold and said second mixing manifold are oriented along a first direction such that said plurality of first mixing manifold input ports and said plurality of second mixing manifold input ports are parallel to said first direction, a first one of said plurality of first mixing manifold input ports coupled with a first output port of a first one of said plurality of mixing valves, a second one of said plurality of second mixing manifold input ports coupled with a second output port of said first one of said plurality of mixing valves, wherein said first output port of said first one of said plurality of mixing valves, said second output port of said first one of said plurality of mixing valves, and an input port of said first one of said plurality of mixing valves are lined up along a second direction that is other than orthogonal or parallel with said first direction.

2. The gas panel of claim 1 further comprising:

a first plurality of process gas input lines, each of said first plurality of process gas input lines supplying a respective one of said plurality of process gases; and a first plurality of primary inlet valves, each of said first plurality of primary inlet valves coupled to a respective one of said first plurality of process gas input lines, wherein each of said plurality of mass flow controllers coupled to a respective one of said first plurality of inlet valves and wherein said each of said first plurality of primary inlet valves selectively controls flow from a respective one of said first plurality of process gas input lines to a respective one of said plurality of mass flow controllers.

3. The gas panel of claim 1 wherein each set of input port, first output port, and second output port of each of said plurality of mixing valves line up parallel to said second direction when assembled in said gas panel.

4. The gas panel of claim 1 wherein said set of process modules has only two process modules per said gas panel.

5. The gas panel of claim 1 wherein said each of said plurality of mixing valves represents a gas-operated valve.

6. The gas panel of claim 1 wherein said each of said plurality of mixing valves represents a single-input-two-common-outputs valve.

7. The gas panel of claim 1 wherein said first mixing manifold occupies a first plane under said plurality of mixing valves, gas lines coupled to input ports of said plurality of mixing valves occupy a second plane under said plurality of said mixing valves, wherein said second plane is between said first plane and said plurality of mixing valves.

8. The gas panel of claim 7 wherein said second mixing manifold is also on said first plane under said plurality of mixing valves.

9. Apparatus for supplying selective ones of a plurality of process gases to a set of process modules of a substrate processing system, said set of process modules having at least two process modules, comprising:

a gas evacuation containment structure;

a plurality of mixing valves, each of said plurality of mixing valves having an input port and a first output port and a second output port, wherein each input port of said input ports of said plurality of mixing valves is configured to receive one of said plurality of process gases;

a first mixing manifold having a plurality of first mixing manifold input ports and at least one first mixing manifold output port for outputting gas from said first mixing manifold to a first process module of said at least two process modules, wherein first output ports of said plurality of mixing valves are in gaseous communication with said first mixing manifold input ports; and a second mixing manifold having a plurality of second mixing manifold input ports and at least one second mixing manifold output port for outputting gas from said second mixing manifold to a second process module of said at least two process modules, wherein second output ports of said plurality of mixing valves are in gaseous communication with said second mixing manifold input ports, wherein said plurality of mixing valves, said first mixing manifold, and said second mixing manifold are disposed within said gas evacuation containment structure and wherein said first mixing manifold and said second manifold are disposed under said plurality of mixing valves, thereby reducing a volume of said gas evacuation containment structure, wherein said first mixing manifold and said second mixing manifold are oriented along a first direction such that said plurality of first mixing manifold input ports and said, plurality of second mixing manifold input ports are parallel to said first direction, a first one of said plurality of first mixing manifold input ports coupled with a first output port of a first one of said plurality of mixing valves, a second one of said plurality of second mixing manifold input ports coupled with a second output port of said first one of said, plurality of mixing valves, wherein said first output port of said first one of said plurality, of mixing valves, said second output port of said first one of said plurality of mixing valves, and an input port of said first one of said plurality of mixing valves are lined up along a second direction that is other than orthogonal or parallel with said first direction.

10. The apparatus of claim 9 wherein each set of input port, first output port, and second output port of each of said plurality of mixing valves line up parallel to said second direction when assembled in said apparatus.

11. The apparatus of claim 9 wherein said set of process modules has only two process modules per said apparatus.

12. The apparatus of claim 9 wherein said each of said plurality of mixing valves represents a gas-operated valve.

13. The apparatus of claim 9 wherein said each of said plurality of mixing valves represents a single-input-two-common-outputs valve.

14. The apparatus of claim 9 wherein said first mixing manifold occupies a first plane under said plurality of mixing valves, gas lines coupled to input ports of said plurality of mixing valves occupy a second plane under said plurality of said mixing valves, wherein said second plane is between said first plane and said plurality of mixing valves.

15. The apparatus of claim 14 wherein said second mixing manifold is also on said first plane under said plurality of mixing valves.

16. The apparatus of claim 9 further comprising:

a plurality of mass flow controllers disposed within said gas evacuation containment structure, each of said plurality of mass flow controllers having an MFC input port and an MFC output port, wherein MFC input ports of said plurality of mass flow controllers are coupled to receive said first plurality of process gases and wherein said input ports of said plurality of mixing valves are in gaseous communication with MFC output ports of said plurality of mass flow controllers.

17. The apparatus of claim 16 further comprising:

a first plurality of process gas input lines, each of said first plurality of process gas input lines supplying a respective one of said plurality of process gases; and a first plurality of primary inlet valves disposed within said gas evacuation containment structure, each of said first plurality of primary inlet valves coupled to a respective one of said first plurality of process gas input lines, wherein each of said plurality of mass flow controllers coupled to a respective one of said first plurality of inlet valves and wherein said each of said first plurality of primary inlet valves selectively controls flow from a respective one of said first plurality of process gas input lines to a respective one of said plurality of mass flow controllers.

18. A method of supplying selective ones of a plurality of process gases to a set of process modules of a substrate processing system, said set of process modules having at least two process modules, comprising:

providing a gas evacuation containment structure;

providing a plurality of mixing valves, each of said plurality of mixing valves having an input port and a first output port and a second output port, wherein each input port of said input ports of said plurality of mixing valves is configured to receive one of said plurality of process gases;

providing a first mixing manifold having a plurality of first mixing manifold input ports and at least one first mixing manifold output port for outputting gas from said first mixing manifold to a first process module of said at least two process modules, wherein first output ports of said plurality of mixing valves are in gaseous communication with said first mixing manifold input ports;

providing a second mixing manifold having a plurality of second mixing manifold input ports and at least one second mixing manifold output port for outputting gas from said second mixing manifold to a second process module of said at least two process modules, wherein second output ports of said plurality of mixing valves are in gaseous communication with said second mixing manifold input ports, wherein said plurality of mixing valves, said first mixing manifold, and said second mixing manifold are disposed within said gas evacuation containment structure and wherein said first mixing manifold and said second manifold are disposed under said plurality of mixing valves, thereby reducing a volume of said gas evacuation containment structure; and orienting said first mixing manifold and said second mixing manifold along a first direction such that said plurality of first mixing manifold input ports and said plurality of second mixing manifold input ports are parallel to said first direction, a first one of said plurality of first mixing manifold input ports coupled with a first output port of a first one of said plurality of mixing valves, a second one of said plurality of second mixing manifold input ports coupled with a second output port of said first one of said plurality of mixing valves, wherein said first output port of said first one of said plurality of mixing valves, said second output port of said first one of said plurality of mixing valves, and an, input port of said first one of said plurality of mixing valves are lined up along a second direction that is other than orthogonal or parallel with said first direction.

19. The method of claim 18 further comprising:

orienting each set of input port, first output port, and second output port of each of said plurality of mixing valves such that the ports in said each set line up parallel to said second direction.

* * * * *

UNITED STATES PATENT AND TRADEMARK OFFICE

CERTIFICATE OF CORRECTION

PATENT NO. : 8,851,113 B2
APPLICATION NO. : 13/431946
DATED : October 7, 2014
INVENTOR(S) : Mark Taskar et al.

It is certified that error appears in the above-identified patent and that said Letters Patent is hereby corrected as shown below:

In the Specification:

Column 5, Line 1 Delete “SOP” and insert --SGP--

Column 7, Line 35 Delete “41413” and insert --414B--

In the Claims:

Column 10, Line 41, Claim 9 Delete “said,” and insert --said--

Column 10, Line 49, Claim 9 Delete “plurality,” and insert --plurality--

Column 12, Line 33, Claim 18 Delete “an,” and insert --an--

Signed and Sealed this
Fourteenth Day of April, 2015

Michelle K. Lee

Michelle K. Lee
*Director of the United States Patent and Trademark Office*